F. A. WARREN.
CENTRIFUGAL OILING BEARING.
APPLICATION FILED DEC. 11, 1909.
962,182.
Patented June 21, 1910.
2 SHEETS—SHEET 2.
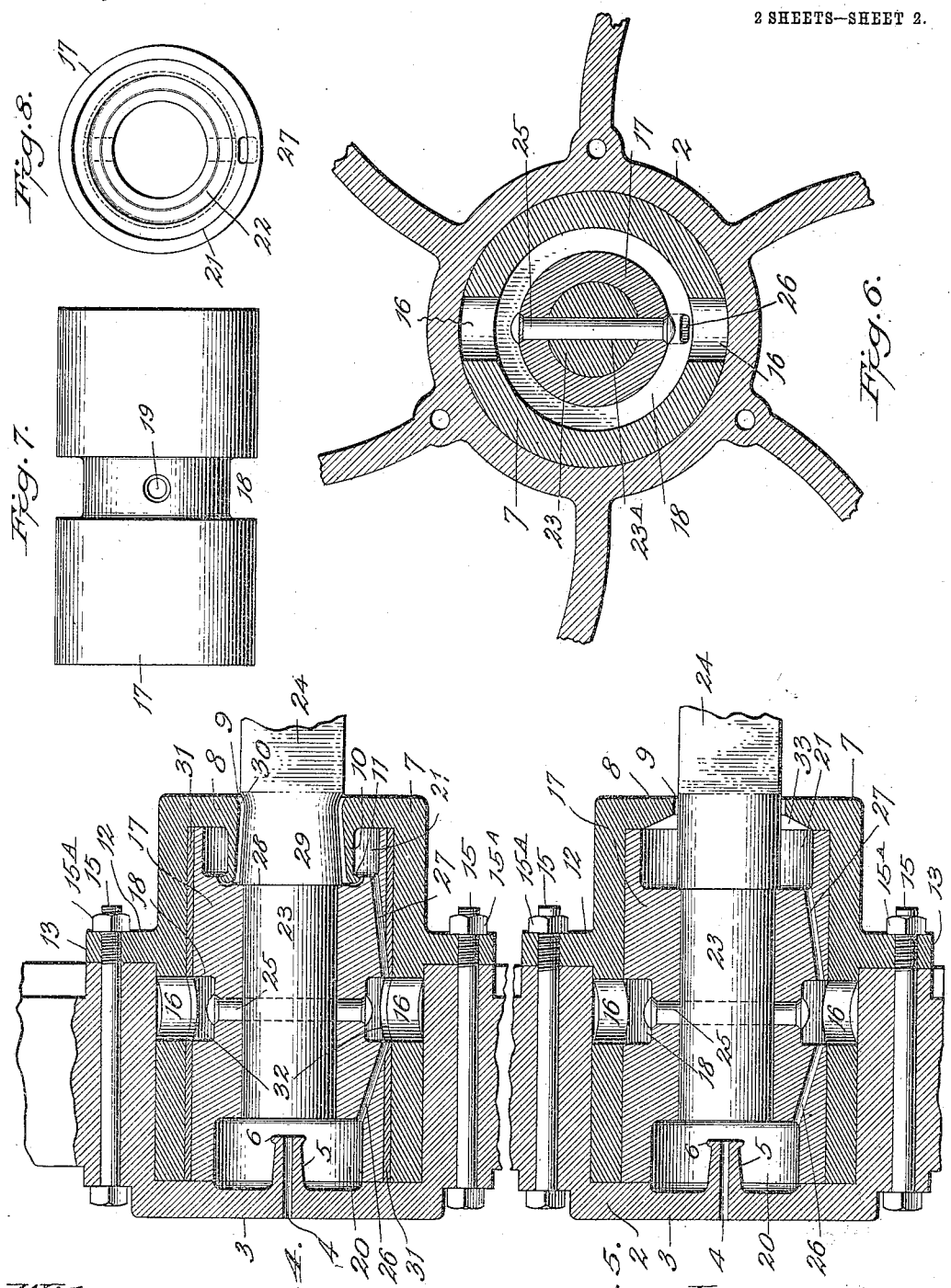

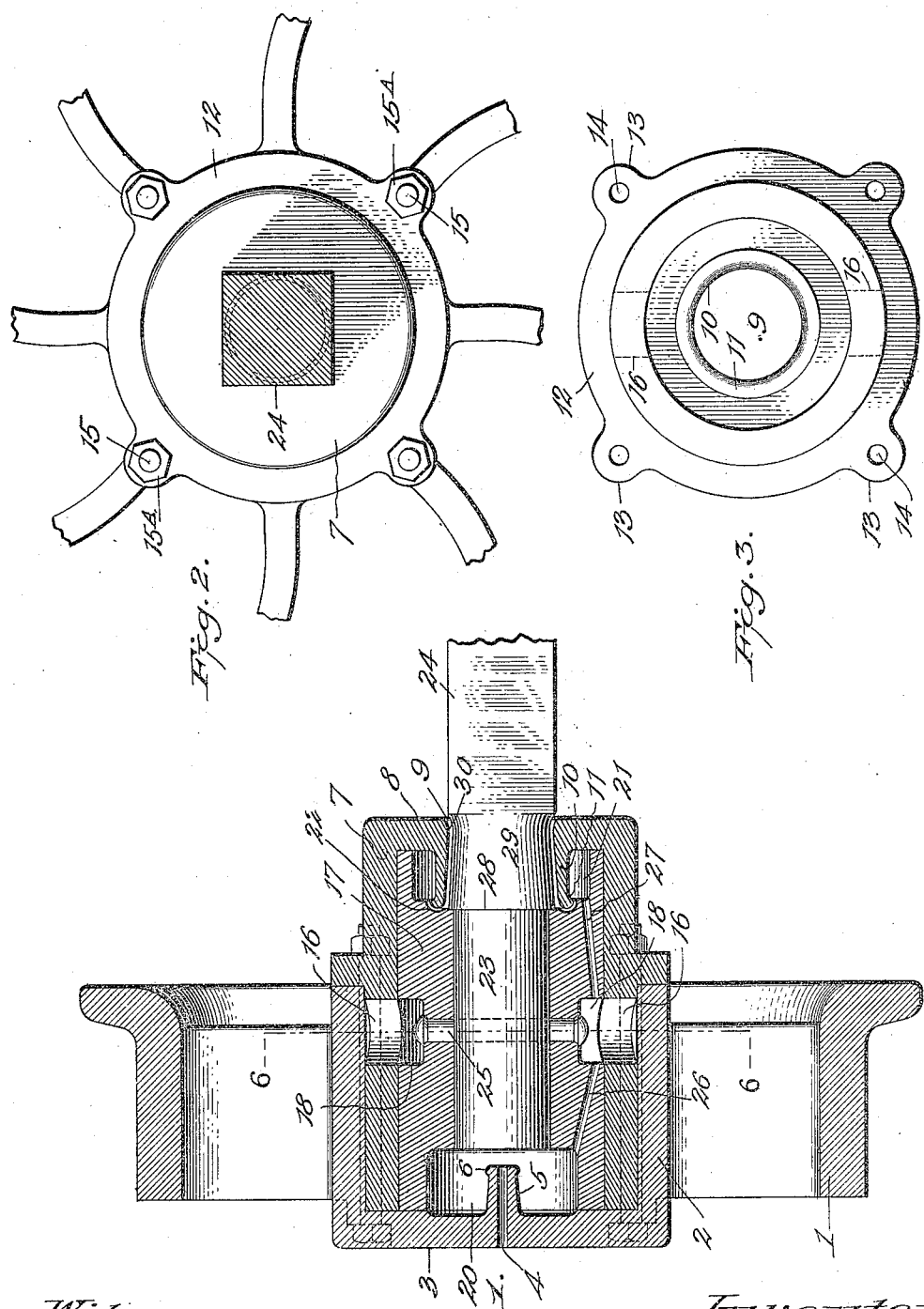

UNITED STATES PATENT OFFICE.

FREDERIC A. WARREN, OF CANON CITY, COLORADO.

CENTRIFUGAL OILING-BEARING.

962,182.

Specification of Letters Patent.

Patented June 21, 1910.

Application filed December 11, 1909. Serial No. 532,565.

*To all whom it may concern:*

Be it known that I, FREDERIC A. WARREN, a citizen of the United States of America, residing at Canon City, county of Fremont, State of Colorado, have invented a new and useful Centrifugal Oiling-Bearing, of which the following is a specification.

This invention relates to centrifugal oiling bearings for car wheels and is designed more particularly as an improvement upon an oiling bearing of this character, for which a patent was granted to me September 8, 1908, Number 897,943.

The primary object of the present invention is to provide a practically dust proof bearing for wheels, wherein a space or chamber is provided for receiving a sufficient quantity of oil to supply the wheel for a long period without the necessity of replenishing the same, the said oil being distributed to the points to be lubricated by the turning action or rotation of the wheel; further, to provide a wheel bearing which is so constructed, relatively to the axle, that it is practically impossible for the wheel to become accidentally disconnected from the said axle, the said bearing being provided with an oil reservoir and a passage leading therefrom and communicating with other passages, whereby the oil is distributed to the entire bearing surface while the wheel is in motion and surrounds the portion of the bearing carrying the weight when the wheel is at rest, the axle being provided with a removable bearing sleeve, which is of sufficient length to take the excessive strain thrown upon it by the side pull in rounding curves. These objects are accomplished by the construction illustrated in the accompanying drawings, in which, Figure 1 is a vertical, sectional view through a car wheel embodying the preferred form of construction. Fig. 2 is a rear view of a portion of a wheel, showing the removable axle box bolted to the hub thereof. Fig. 3 is a front elevation of the removable axle box. Fig. 4 is a sectional view of a wheel hub similar to that shown in Fig. 1, the axle sleeve being provided with a supplemental wearing sleeve. Fig. 5 is a similar sectional view showing a slight modification in the construction of the rear end of the axle sleeve and of the axle box. Fig. 6 is a central, transverse, sectional view through the wheel, on the line 6—6 of Fig. 1. Fig. 7 is a side elevation of the form of axle sleeve shown in Figs. 1 and 4. Fig. 8 is an end view thereof.

In the style of mining car wheels in practical use at the present time, it has been found impossible to retain a quantity of oil within the wheel hub for any great length of time, as the said hubs are not provided with means for closing their rear ends, and the oil, under the centrifugal action of the wheel, soon works along the axle to the rear of the hub, when it is thrown off, and in wheels in which the hub is provided with oil grooves the oil under centrifugal action is held in the grooves at the time when it is most needed, namely, when the wheel is under greatest speed. The grooves moreover soon become filled with gummed oil and dirt, which renders them useless. The present invention is designed to overcome these objections by providing a practically dirt proof bearing, and one in which the oil circulates from one end of the bearing to the other without escaping from the hub, thus effecting a great saving of oil, while it is necessary to replenish the supply only at long intervals.

Referring to the accompanying drawing: The numeral 1 indicates a wheel such as is used in connection with the ordinary mining cars, though the invention is applicable to railway cars as well. The wheel is provided with a hub 2, the bore of which is much greater in diameter than the bores of such wheels as are in use at the present time. The front or outer end of the hub is closed by a wall 3, having a central oil inlet aperture 4, which also extends through a projecting lug 5, formed on the rear of the wall 3, the end of the lug terminating in an annular rim 6, as shown.

Spokes connect the hub and felly so as to form an integral structure, and an axle box 7 is designed to fit within the hub and extend beyond its rear end. This box is in the form of a cylindrical casing, the forward end of which is open, and is designed to rest against the wall 3, while the rear end of the box is formed with a wall 8 having an axial hole 9 in which the axle rotates. This opening is surrounded by a cylindrical band or collar 10, which projects inward a suitable distance from the wall 8 and terminates in an annular rim 11. The box 7 extends approximately one-half its length beyond the rear end of the hub, and it is provided with an annular collar 12, which rests against the rear end of the hub and which is formed with ears 13, having threaded apertures 14, which register with holes which extend through the spokes adjacent to their union with the hub. Bolts 15 are passed through the spoke holes and through the threaded apertures 14 in the ears 13 and receive nuts 15ᴬ, which securely hold the box within the hub. When the wheel is formed with eight spokes, as shown in Fig. 2, four bolts are used for securing the box, but where the wheel is formed with six spokes, as shown in Fig. 6, three bolts are employed. At diametrically opposite points and about midway of the length of the box 7, holes 16 are formed through the wall of the same, the object of which will presently appear.

Before the axle box is bolted in the hub a steel bearing sleeve 17 is inserted in the same, the inner end of which bears against the wall 8, while its outer end is flush with the outer end of the box and is adapted to bear against the wall 3 of the hub. This sleeve is formed with an annular groove or recess 18 which coincides with the holes 16 in the box, and at diametrically opposite points on the face of the recess holes 19 extend through to the bore of the sleeve. The outer end of the sleeve 17 is formed with a circular recess of suitable depth, which, with the wall 3 of the hub, forms a chamber or reservoir 20 for the reception of oil, which is supplied through the opening 4. The inner or rear end of the sleeve is also provided with a circular recess 21, into which the annular band or ring 10 projects, and the face of this recess is formed with a circular groove 22, which receives the annular rim 11 on the end of the band or collar 10. The axial hole 9 tapers slightly from the annular rim 10 to its outer end, and the spindle 23 of an axle 24 is passed through the hole 9 and inserted in the bore of the sleeve 17. The spindle is provided with a hole 23ᴬ, which is adapted to register with the holes 19 in the sleeve, and through these holes a steel pin 25 is passed and riveted at its ends; this operation being performed by passing a suitable riveting tool through the holes 16 in the sleeve, which holes are provided for that purpose.

An inclined channel or passage 26 extends from the bottom of the reservoir 20 to the annular recess 18, and a similar passage 27 extends from the opposite side of the recess 18 to the bottom of the recess 21, the said passages 26 and 27 being downwardly inclined from their respective chambers to the annular recess. It will thus be apparent that the oil in the reservoir 20 passes through the passage 26 into the annular recess 18 and works around the sleeve from end to end. The oil which works over the rear end of the sleeve lodges in the recess 21, whence it passes through the passage 27 back to the annular recess 18 and so continues to circulate.

The spindle proper terminates at its rear end in a shoulder 28, which bears against the face of the recess 21, and from this shoulder the axle tapers, as shown at 29, to correspond with the taper of the axial hole 9, the axle being preferably square in cross section outside of the boxes. The outer end of the hole 9 is slightly flared, as shown at 30, Figs. 1 and 4, and the axle is correspondingly flared, but the diameter of the hole 9 at its most contracted point is sufficient to permit the shoulder 28 to pass freely through it.

As the box revolves upon the sleeve 17 the oil in the recess 21 is carried around the band 10, but is prevented from working onto the axle by the annular flange 11, and the taper of the hole 9 causes any oil that may work into the same to flow back into the recess 21. The annular rim 6 on the lug 5 also prevents oil which works around the said lug 5 from passing out through the aperture 4. The oil works over the ends of the sleeve which bear upon the walls 3 and 8 of the hub and box respectively, and receive the end thrust of the axle.

In pulling the cars around curves, the strain on the bearing is in excess of the load strain, and to meet this condition the bearing is projected beyond the rear end of the hub so as to extend under the car, and thus present a long bearing surface.

In Fig. 4 I illustrate a bearing in all respects similar to that shown by Fig. 1, with the single exception that in the latter construction the bearing sleeve 17 is incased in a thin supplemental steel sleeve 31, having oppositely positioned holes 32, which are adapted to register with the holes 16 in the axle box. When the outer sleeve 31 is employed the inner sleeve may be made of cast iron and the sleeve 31 when worn out may be removed and replaced by a new one, thus reducing the cost of maintaining the bearings, and the time required for repairs, to a minimum.

In Fig. 5 is illustrated a form of bearing similar to that shown in Fig. 1, the only difference being that in this construction the axial band 10 projecting from the end wall 8 of the axle box is dispensed with and the inner face of the said wall is dished or concaved from the circumference of the axial hole 9 to the adjacent end of the sleeve 17, as shown at 33. The object of this dished face is to direct the oil flowing over it back into the chamber or recess 21 and thus prevent it working out through the said hole 9. The supplemental sleeve 31 may be used with this form of bearing also.

In assembling the parts, the sleeve 17 is inserted in the box 7 in position to bring the holes 19 in the annular groove 18, in line with the holes 16 in the said box. The spindle of the axle is then inserted in the hole 9 of the box, and passed into the bore of the sleeve so that its hole 23ᴀ registers with the holes 19 in the sleeve. The pin 25 is then passed through these holes and riveted, the riveting implement being inserted through the holes 16 in the box. The box is then inserted in the bore of the hub and bolted to the hub in the manner illustrated. The reservoir 20 is then supplied with oil through the inlet hole 4, and the oil passes through the passage 26 into the annular groove 18 of the sleeve, and as the wheel revolves the oil works in between the sleeve and box and from one end of the same to the other. The oil working over the rear end of the sleeve enters the recess 21 in its end, and flows back through the passage 27 to the annular groove 18, and thus the oil is not only constantly circulating while the wheel is in motion, but it is retained within the bearing, thus effecting a great saving in oil, and at the same time making it necessary to replenish the reservoir only after long intervals.

In practical operation cars furnished with wheels constructed as herein described have been run for several weeks, under average conditions, without the necessity of replenishing the oil reservoirs.

Having described the invention, what I claim as new and desire to secure by Letters Patent is:

1. In an oiling bearing as specified, the combination with a wheel hub closed at one end and having an inlet aperture in the closed end, of a bearing box secured within said hub having its inner end open, and an axial hole in its opposite end, a sleeve in said box, an axle spindle extending through the axial hole in the box and secured within the sleeve, said sleeve having a chamber in each end, an annular groove in its periphery and passages connecting said groove and chambers.

2. In an oiling bearing as specified, the combination with a wheel hub closed at one end and having an oil inlet hole in said closed end, of a bearing box rigidly secured within said hub having its inner end open and its outer end closed, and an axial hole in said closed end, said box being projected beyond the open end of the hub, a sleeve in said box having a chamber in each end, an annular, circumferential groove, and passages connecting said chambers and groove, and an axle extending through the axial hole in the bearing box and rigidly secured within the bore of the said sleeve.

3. In an oiling bearing as specified, the combination with a wheel hub closed at one end, an inlet hole being formed in said closed end, of an axle, a sleeve secured upon said axle having a chamber in each end, an annular, circumferential groove, and passages connecting the said chambers and groove; a boxing rotatably mounted upon said sleeve having an axial hole at one end for the passage of the axle, its opposite end being flush with the end of the sleeve, said boxing being inserted in the wheel hub, an annular collar on the boxing adapted to rest against the end of the hub, and securing bolts which pass through said collar and hub.

4. In an oiling bearing as specified, the combination with a wheel hub having a closed end, a lug projecting centrally from the inner face of said end and terminating in an annular rim, an oil inlet being formed through said lug and closed end, of an axle, a sleeve rigidly secured upon the axle having an annular, circumferential groove, a circular chamber in each end and passages connecting the chambers with the groove, and a boxing rotatably mounted on the sleeve and secured within the hub against rotation, said boxing being extended beyond the open end of the hub and provided with an axial hole through which the axle passes.

5. In an oiling bearing as specified, the combination of a wheel hub closed at one end, a boxing rigidly secured in the hub and closed at its outer end, which is formed with an axial hole, while the closed end of the hub has an oil inlet passage, a sleeve in the boxing, its ends abutting respectively against the ends of the boxing and hub, said sleeve being provided with an annular, circumferential groove, a chamber in each end, and inclined passages connecting the chambers with the annular groove, an axle extending through the axial hole of the boxing and into the bore of the sleeve, and means for securing said sleeve upon the axle.

6. In an oiling bearing as specified, the combination of a wheel hub closed at one end, a boxing in the hub, closed at its outer end, a sleeve in the boxing having end chambers and passages connecting the chambers and an axle secured within said sleeve and extending through an axial hole in the boxing, an oil inlet being formed in the closed end of the hub.

7. In an oiling bearing as specified, the combination with a wheel hub, closed at one end, an oil inlet hole being formed in said closed end, of a cylindrical boxing adapted to be rigidly secured within said hub and having its outer end closed and provided with an axial hole, the boxing being provided with two diametrically opposite holes which are inclosed by the hub, a sleeve in the boxing having a chamber in each end, an annular, circumferential groove which registers with the oppositely positioned holes in the boxing, and passages connecting the chambers with said groove, an axle extending through the axial hole in the boxing and into the bore of said sleeve, and a pin extending through said sleeve where the groove occurs and through the axle.

8. In an oiling bearing as specified, the combination with a wheel hub having one end open, and one end closed, a lug projecting from the closed end, which terminates in an annular rim, said lug and closed end being provided with an inlet aperture, of a cylindrical boxing rigidly secured in the hub, the outer end of which is closed and provided with an axial hole, while the portion of the boxing within the hub is provided with two diametrically opposite holes, said boxing being extended beyond the open end of the hub, an axle extending through the axial hole in the hub; a sleeve upon said axle, the ends of which abut respectively against the end of the hub and the end of the boxing, said sleeve having an annular groove registering with the oppositely positioned holes in the boxing, a circular chamber in each end, and inclined passages connecting the chambers with the annular groove, an integral band projecting from the closed end of the boxing which terminates in an annular rim and surrounds the axle and a pin extending through the sleeve and axle where the annular groove occurs in the sleeve.

9. In an oil bearing as specified, the combination with a wheel hub having a closed end provided with an oil inlet hole, of a cylindrical boxing secured within the hub, having its outer end closed and provided with an inwardly projecting band which terminates in an annular rim, said band forming a continuation of an axial opening in said closed end, a sleeve in said boxing having an annular circumferential groove, a chamber in each end and passages connecting the chambers with the annular groove, an axle extending through the axial hole in the boxing and into the sleeve, having a shoulder which abuts against the end of the adjacent chamber in said sleeve, and means for securing the axle upon the sleeve.

10. In an oil bearing as specified, the combination of a wheel hub, a boxing rigidly secured in said hub, a sleeve in the boxing having chambers in its ends, an annular groove and passages connecting the chambers and groove, an axle extending through an opening in the boxing and into the bore of the sleeve, and a pin extending through the grooved portion of the sleeve and through the axle, the hub being provided with an oil inlet hole.

11. In an oil bearing as specified, the combination of a wheel hub, a boxing rigidly secured in the hub, having a collar which bears against the end of said hub, a sleeve in the boxing having end chambers, an annular groove and passages connecting the chambers and groove, an axial projection on the inner face of the end of the boxing which terminates in an annular rim which extends into a circular recess formed in the adjacent end of the sleeve, an axial tapered hole being formed through said projection, and the end of the boxing, and an axle extending through the tapered hole and secured within the sleeve, having a tapered portion corresponding to said tapered hole, which terminates in a shoulder which abuts against the adjacent end of the sleeve, the hub being provided with an oil inlet hole.

12. In an oiling bearing as specified, the combination of a wheel hub, a boxing rigidly secured in said hub, a sleeve in the boxing having chambers in its ends, and passages connecting said chambers, a supplemental sleeve surrounding said chambered sleeve, an axle extending through an axial hole in the boxing and into the bore of the sleeve, and means for securing the axle within the sleeve, the hub being provided with an oil inlet hole.

In testimony whereof I affix my signature in presence of two witnesses.

FREDERIC A. WARREN.

Witnesses:
FREDERIC WILLIAMS,
GUY W. HARDY.